(12) United States Patent
Howes

(10) Patent No.: US 7,360,978 B2
(45) Date of Patent: Apr. 22, 2008

(54) COMBINATION CHAIN AND STRAP TIE DOWN APPARATUS AND SYSTEM

(75) Inventor: Phillip Bryan Howes, Braselton, GA (US)

(73) Assignee: Cottroll, Inc., Gainesville, GA (US)

( * ) Notice: Subject to any disclaimer, the term of this patent is extended or adjusted under 35 U.S.C. 154(b) by 0 days.

(21) Appl. No.: 11/334,237

(22) Filed: Jan. 18, 2006

(65) Prior Publication Data

US 2006/0263160 A1 Nov. 23, 2006

Related U.S. Application Data

(60) Provisional application No. 60/681,758, filed on May 17, 2005.

(51) Int. Cl.
*B65D 63/00* (2006.01)
(52) U.S. Cl. ......................................................... 410/7
(58) Field of Classification Search ................. 410/2, 410/3, 7, 8, 9, 10, 11, 12, 23, 96, 97, 101, 410/102, 103, 106
See application file for complete search history.

(56) References Cited

U.S. PATENT DOCUMENTS

| | | | | |
|---|---|---|---|---|
| 3,860,263 A | * | 1/1975 | Taylor | 410/12 |
| 4,273,484 A | * | 6/1981 | Blanar | 410/12 |
| 5,180,262 A | * | 1/1993 | Westerdale | 410/12 |
| 5,277,407 A | * | 1/1994 | Mayne et al. | 254/369 |
| 5,314,275 A | * | 5/1994 | Cottrell et al. | 410/26 |
| 6,558,092 B1 | * | 5/2003 | Woodruff | 410/12 |
| 7,114,897 B1 | * | 10/2006 | Boydstun et al. | 410/19 |
| 2004/0037664 A1 | * | 2/2004 | Woodruff | 410/12 |

OTHER PUBLICATIONS

International Search Report and Written Opinion of the International Searching Authority for International Application No. PCT/US06/16598 filed May 2, 2006, 7 pages.

* cited by examiner

*Primary Examiner*—H Gutman
(74) *Attorney, Agent, or Firm*—Cantor Colburn LLP

(57) ABSTRACT

A combination chain and strap tie-down apparatus and system. An elongated shaft is attached to an automobile transport platform. A ratchet gear wheel having engagement teeth and a ratchet wrench socket wheel having a plurality of wrench apertures can be located on one side of the shaft together or on opposite sides of the shaft. A strap spool is slidably connected to the shaft. The spool generally includes two side plates connected by a strap attachment bracket. A quick release pawl is connected to the platform adjacent the ratchet gear wheel for engagement with the engagement teeth. The pawl is connected to an elongated rod that is connected to the platform generally parallel with the shaft. The rod partially protrudes adjacent the ratchet wrench wheel. A spring is connected to the shaft adjacent the pawl. A shaft extension is included on one end of the shaft for receiving a chain.

9 Claims, 12 Drawing Sheets

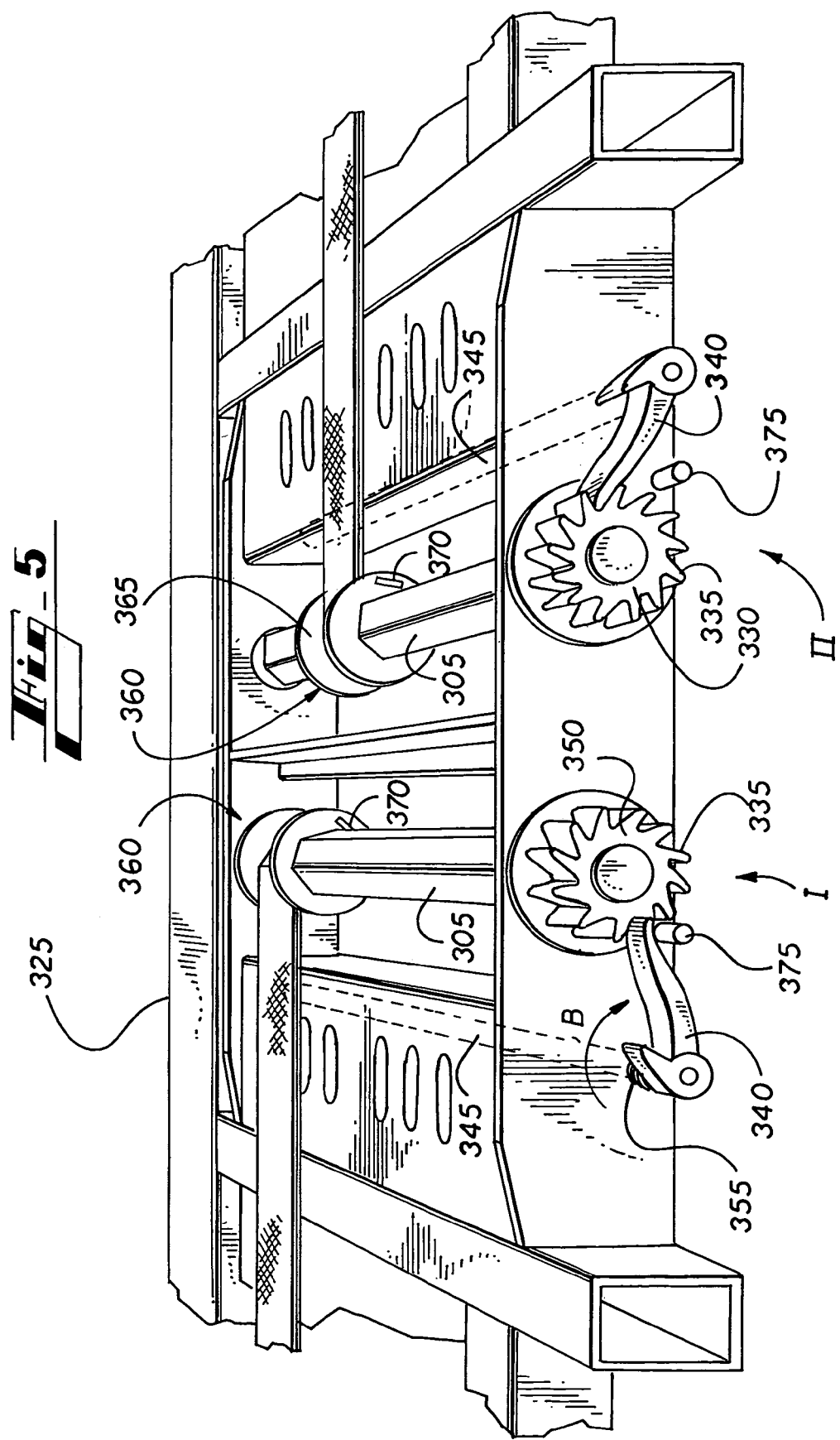

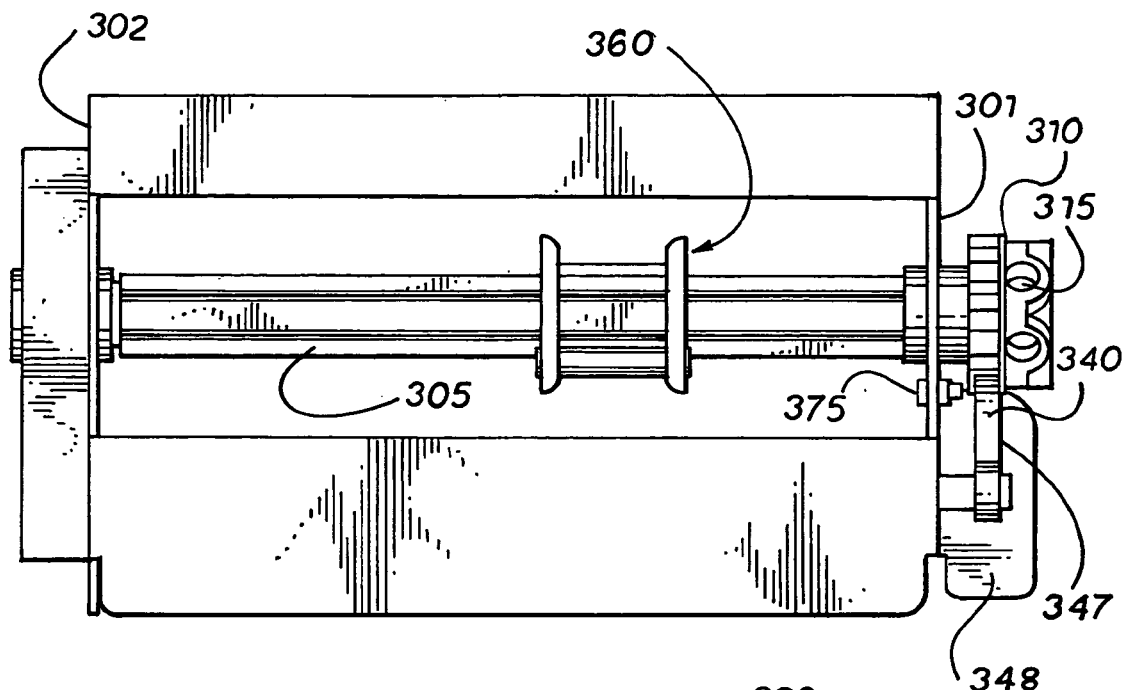
Fig_6
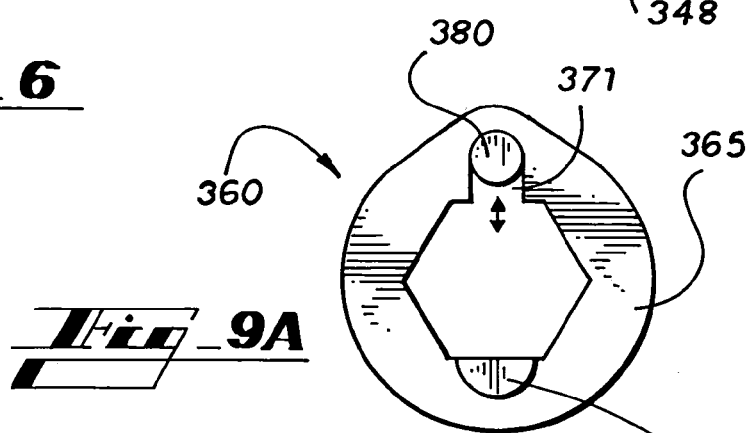
Fig_9A
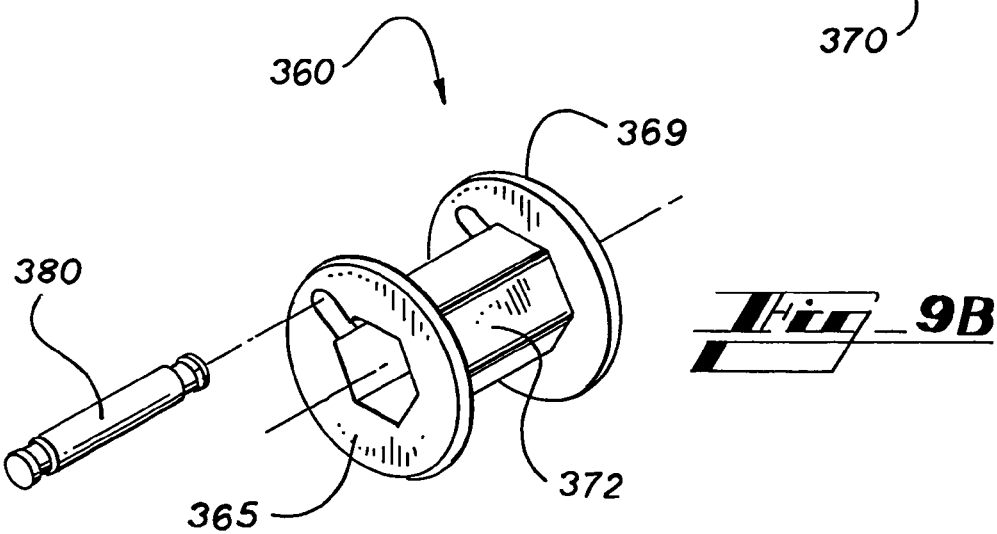
Fig_9B

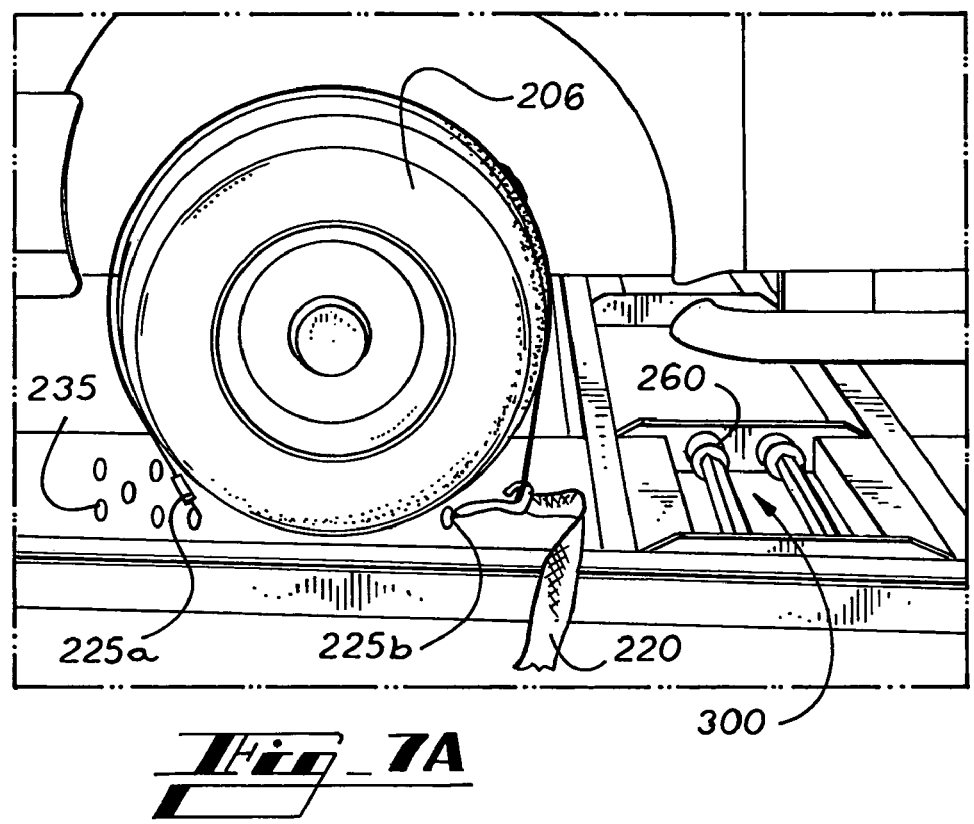
Fig_7A
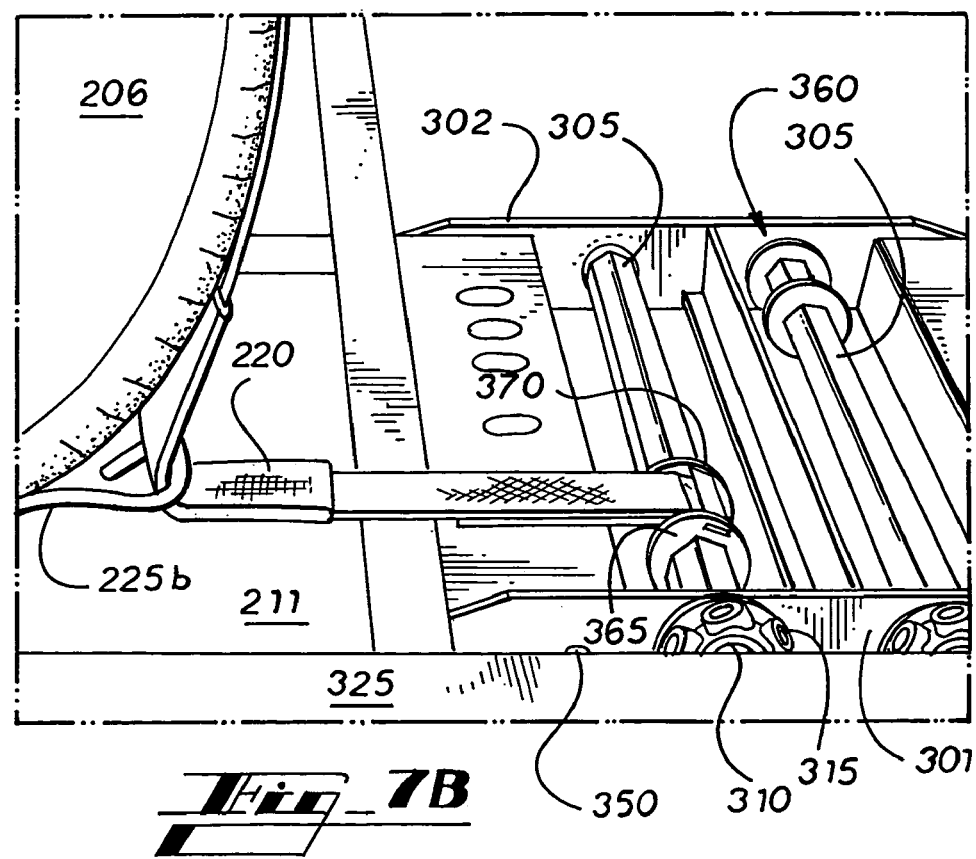
Fig_7B

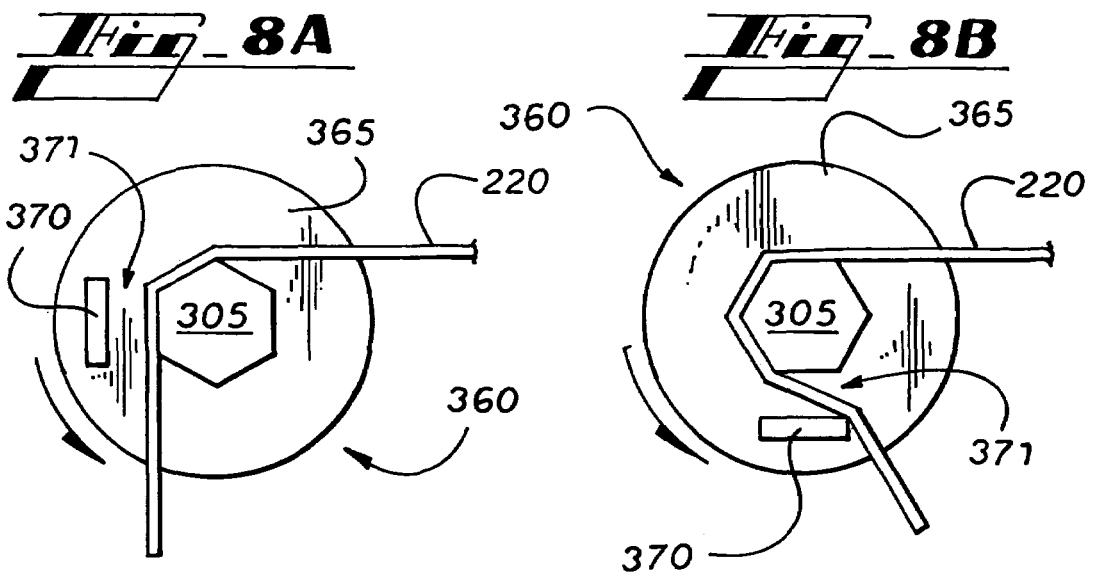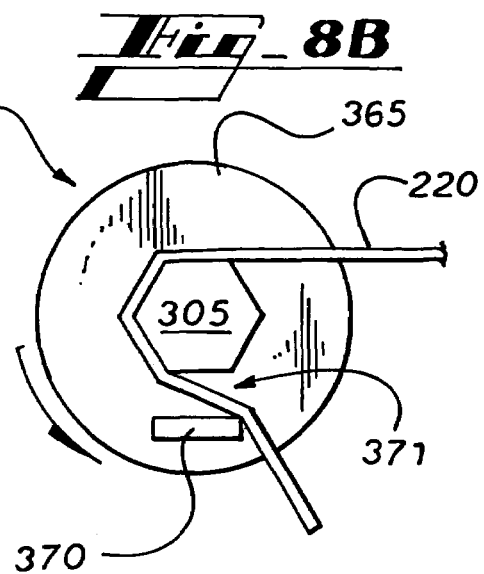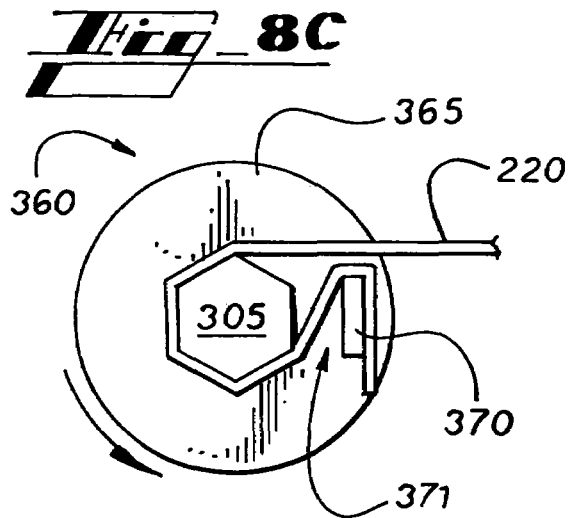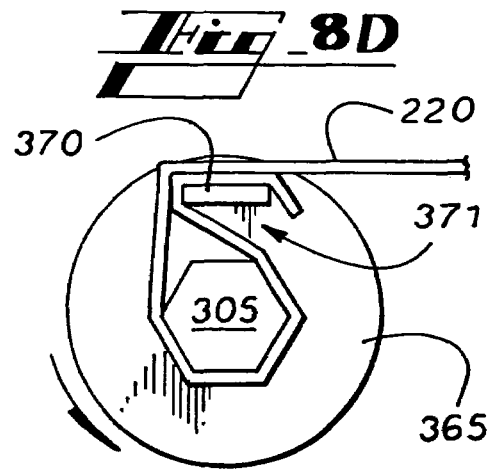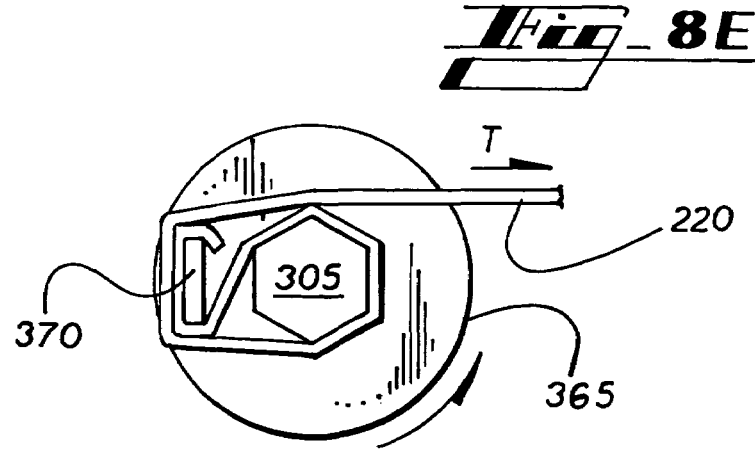

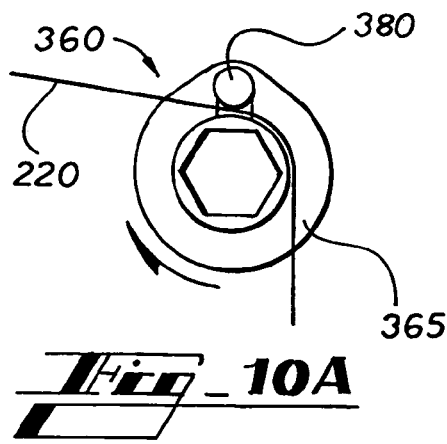
Fig_10A
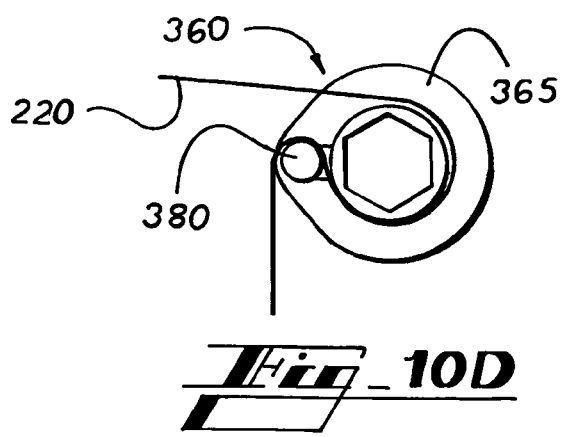
Fig_10D
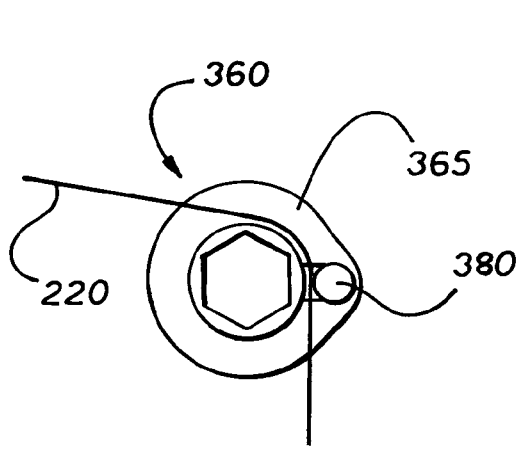
Fig_10B
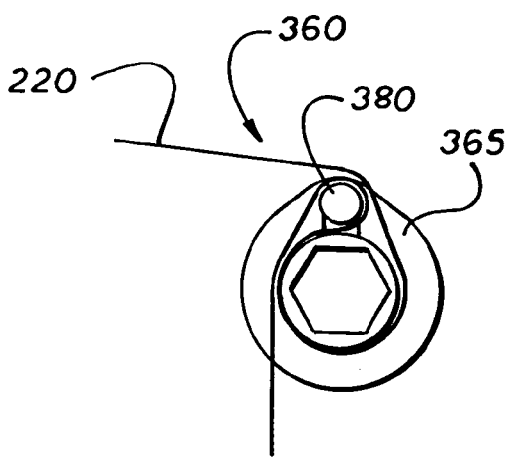
Fig_10E
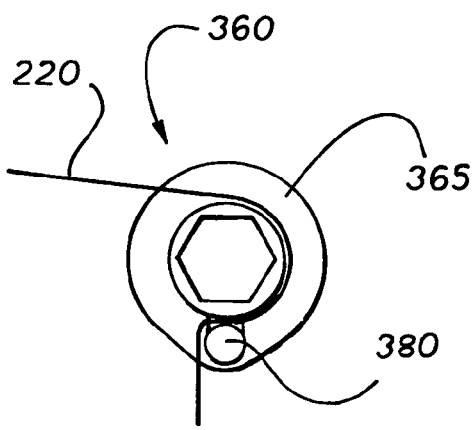
Fig_10C
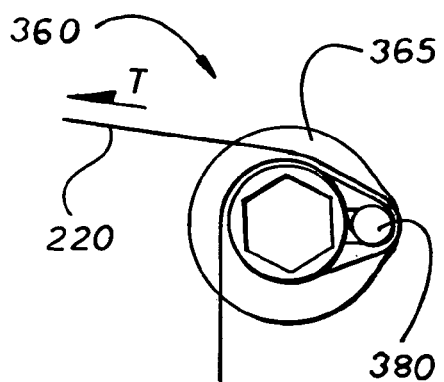
Fig_10F

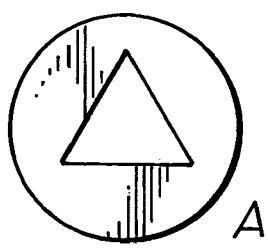
A
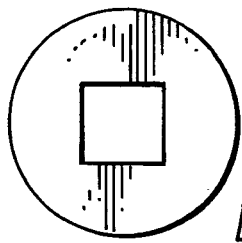
B
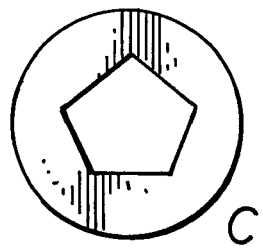
C
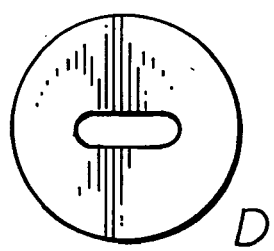
D
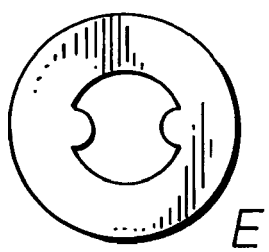
E
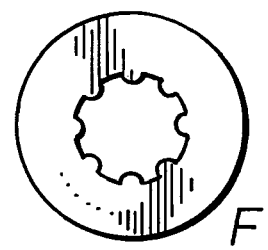
F
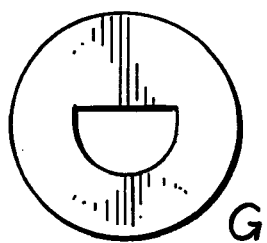
G
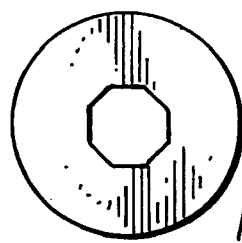
H
*Fig_11*
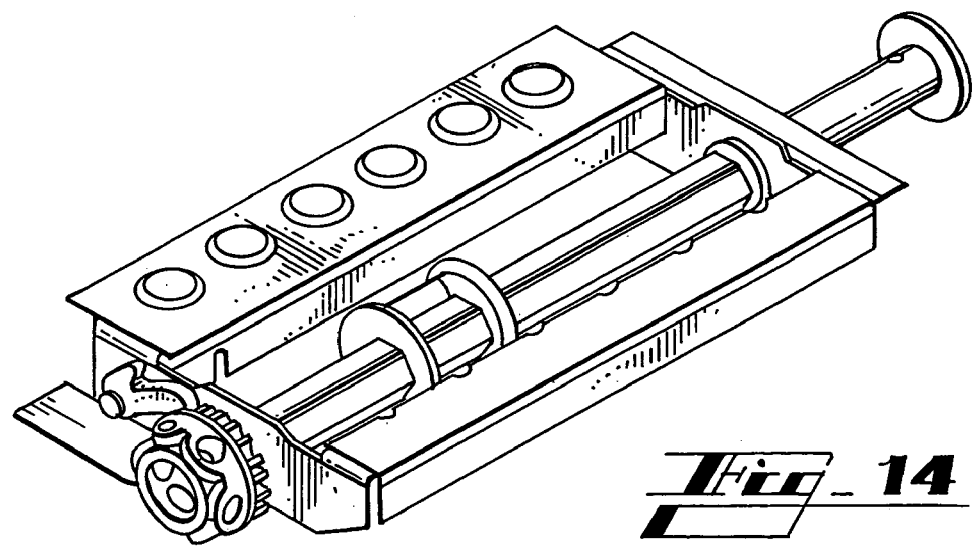
*Fig_14*

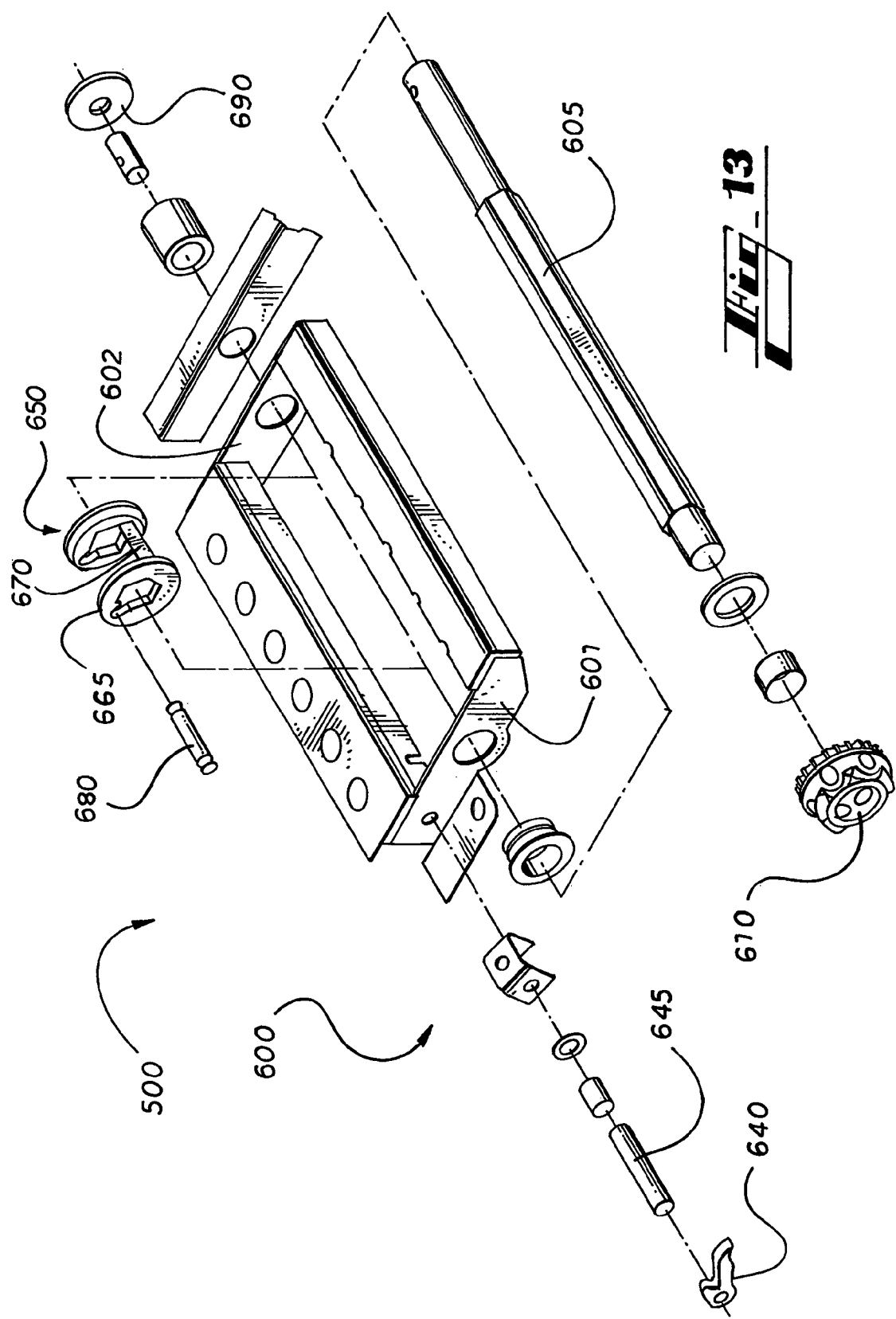

COMBINATION CHAIN AND STRAP TIE DOWN APPARATUS AND SYSTEM

Priority based on U.S. Provisional Patent Application, Ser. No. 60/681,758, filed May 17, 2005 and entitled "Strap Tie Down Apparatus and System" is claimed.

BACKGROUND

I. Field of the Invention

The present invention relates generally to the field of automobile and cargo transport and more particularly to a strap tie down apparatus and system.

II. Description of the Related Art

FIG. 1A illustrates a prior art vehicle transport trailer 100. Several vehicles 105 can be transported on the trailer. Each of the vehicles typically has its own platform 110 onto which each vehicle 105 is secured.

FIG. 1B illustrates a side view of a prior art vehicle trailer tie down system 101. As previously described, each vehicle 105 is secured to its platform 110. FIG. 1B illustrates the vehicle 105 tied to its platform 110 by chains 115 in a "V" arrangement. Those skilled in the art understand that the chains can be tied in other arrangements such as an "A" arrangement. The vehicle 105 is typically restrained to the platform 100, and therefore the trailer, by connecting the chains 115 to the frame of the vehicle 105 and the platform 110 or other part of the trailer. The chains 115 are placed in tension to prevent movement. The chains 115 are tightened in opposite directions to prevent the vehicle 105 from shifting front to back or vice versa. Currently, locking mechanisms 120 are used to keep the chain 110 from loosening due to forces acting upon the vehicle 105 (e.g. gravity, centripetal and other forces asserted on the vehicle 105 from the trailer or otherwise). There are many types of mechanisms 120 such as ratchet and clamping devices that are typically manually tightened by the driver of the trailer. The chain 115 may also have to be routed around idlers 125 or the tightening mechanism 120 has to be relocated in order to achieve sufficient tension in the chain 110 in the correct direction to properly secure the vehicle 105.

Nylon or polyester straps are also sometimes used to secure vehicles to transport trailers. In this mode of securement, strap assemblies are wrapped around the vehicle tires 206 and tensioned to the platform 110. Tension is typically provided by a portable hand ratchet mechanism, or by hooking the end of the strap to the end of a conventional tie down chain, and tensioned in a similar manner as a chain tie down vehicle.

Therefore, present automobile transporters typically use chains or straps to tie down automobiles to transport trailers. Regardless of the tension device used, the driver, typically wraps a chain or strap onto a strap spool and tightens the strap on the spool with the ratchet system. These tie down apparatuses and systems are typically fixed in definite locations and lack flexibility of positioning for automobiles of varying size, wheel base, tire size and the like.

SUMMARY

In general, the invention features a strap tie down apparatus and system. In general, the apparatus includes an elongated, typically non-circular, shaft generally attached to a transport platform. A ratchet gear wheel having engagement teeth is located on one side of the shaft and a ratchet wrench socket wheel having a plurality of wrench apertures is located on the other side of the shaft. In another embodiment, a ratchet gear wheel having engagement teeth and a plurality of wrench apertures is located on one or both ends of the shaft. The apparatus further includes a strap spool slidably connected to the shaft. The spool generally includes two side plates connected by a strap attachment bracket. A spring loaded quick release pawl is connected to the platform adjacent the ratchet gear wheel for engagement with the engagement teeth. In another embodiment, the pawl can be connected to an elongated rod that is connected to the platform generally parallel with the shaft. The rod partially protrudes adjacent the ratchet wrench wheel. A spring is connected to the shaft adjacent the pawl.

In general, in one aspect, the invention features a strap tie down apparatus, including an elongated shaft, a strap spool slidably connected to the shaft, a ratchet gear wheel located on one end of the shaft and a ratchet wrench wheel located on one end of the shaft.

In one implementation, the apparatus further includes a rod positioned generally parallel to the elongated shaft, a pawl connected to an end of the rod, the pawl being adjacent the ratchet gear wheel and a stop rod adjacent the ratchet gear wheel and located in a circular path defined by the rotation of the pawl about the rod.

In another implementation, the apparatus further includes a spring connected to the rod adjacent the pawl.

In another implementation, the spring is a combination torsion and compression spring.

In another implementation, the pawl is biased to rotate through an arc defined in a plane parallel to the ratchet gear wheel when the pawl is disengaged from the ratchet gear wheel.

In still another implementation, the pawl is further biased in a direction defined along the rod to return to an engagement with the ratchet gear wheel.

In yet another implementation, the ratchet gear wheel and the ratchet wrench wheel are located on one end of the shaft.

In another implementation, the ratchet gear wheel and the ratchet wrench wheel are located on opposite ends of the shaft.

In another implementation, the strap spool includes a first side wall, a second side wall parallel to the first side wall and a strap attachment bracket connected between and to the outer portions of the side walls and at a fixed radius from the elongated shaft.

In another implementation, the apparatus further includes a moveable strap attachment bracket connected between the side walls and at a variable distance from the elongated shaft.

In another implementation, the shaft has a non-circular cross section.

In another implementation, the strap spool includes a central opening oriented about the non-circular cross section of the shaft.

In another implementation, the strap spool includes a first side wall, a second side wall parallel to the first side wall and an inner strap sleeve positioned between the first and second side walls and surrounding a portion of the shaft.

In another implementation, the elongated shaft is connected between a first support panel and a second support panel.

In another implementation, the ratchet gear wheel located on one end of the shaft and to the first support panel.

In another implementation, the ratchet wrench wheel located on one end of the shaft and to the second support panel.

In another implementation, the ratchet gear wheel and the ratchet wrench wheel are located on one end of the shaft and connected to one of the first and second support panels.

In another aspect, the invention features a strap tie down system, including an elongated shaft, a strap spool slidably connected to the shaft, the strap spool having a first side wall, a second side wall parallel to the first side wall and a strap attachment bracket connected between and to outer portions of the side walls, thereby defining a space between a portion of the shaft located between the side walls and the strap attachment bracket, a ratchet gear wheel located on one end of the shaft, a ratchet wrench wheel located on one end of the shaft and a portion of a strap located in the space.

In one implementation, tension is applied to the strap when the shaft is rotated thereby pressing the strap attachment bracket against the strap, thereby pressing the strap into itself.

In another aspect, the invention features a strap tie down system, including an elongated shaft, a strap spool connected to the shaft, means for transferring torque between the spool and the shaft, means for preventing rotation of the strap spool with respect to the elongated shaft and means for varying the position of the strap spool along the length of the elongated shaft.

In another aspect, the invention features a strap tie down apparatus, including an elongated shaft located between a first support plate and a second support plate, a shaft extension connected to the elongated shaft and protruding beyond a surface of one of the first and second support plates, a vehicle tying device connected to the shaft extension, a ratchet gear wheel located on one end of the shaft and a ratchet wrench wheel located on one end of the shaft.

In one implementation, the vehicle tying device is a chain.

In another implementation, the chain is bolted to the shaft extension.

In another implementation, the apparatus further includes a strap spool coupled to the shaft.

In another implementation, the strap spool is adjustable along the shaft.

In another implementation, the strap spool rotates with the shaft.

In still another implementation, the ratchet gear wheel and the ratchet wrench wheel are located on one end of the shaft and the shaft extension is located on the other end of the shaft.

In another implementation, the apparatus further includes a coupling located between and rotatably connecting one of the first and second support plates and the shaft.

In another aspect, the invention features a combination chain and strap tie down system, including an elongated shaft located between a first support plate and a second support plate, a shaft extension connected to the elongated shaft and protruding beyond a surface of one of the first and second support plates, a chain connected to the shaft extension, a ratchet gear wheel located on one end of the shaft, a ratchet wrench wheel located on one end of the shaft, a strap spool for receiving a strap located along the elongated shaft and means for transferring torque between the strap spool and the elongated shaft.

One advantage of the invention is that it allows flexibility in strapping cars of varying size, wheelbase and the like to a transport platform.

Another advantage of the invention is that straps can be efficiently torqued with little effort.

Another advantage of the invention is that the strap spool can be positioned at a spectrum of locations along its shaft.

Another advantage of the invention is that the ratchet can be quick released.

Other objects, advantages and capabilities of the invention are apparent from the following description taken in conjunction with the accompanying drawings showing the preferred embodiment of the invention.

BRIEF DESCRIPTION OF THE DRAWINGS

FIG. 5 illustrates a inboard partial perspective side view of an embodiment of a strap tie down system;

FIG. 6 illustrates another embodiment of a strap tie down system, typically mounted to the end of a platform;

FIG. 7A illustrates a outboard partial perspective side view of an embodiment of a strap tie down system connected to a vehicle wheel;

FIG. 7B illustrates a outboard partial perspective side view of an embodiment of a strap tie down system connected to a vehicle wheel;

FIGS. 8A-8E illustrate several positions of an embodiment of a strap spool apparatus during a tensioning process tightening upon itself;

FIG. 9A illustrates an alternate embodiment of a strap spool;

FIG. 9B illustrates another alternate embodiment of a strap spool;

FIGS. 10A-10F illustrate several positions of an embodiment of a strap spool apparatus during a tensioning process;

FIGS. 11A-11H illustrate multiple alternate embodiments for cross sections of non-circular torque transferring shafts and respective strap spools;

FIG. 13 illustrates an exploded perspective view of the a strap tie down system having an embodiment of a strap tie down apparatus as illustrated in FIG. 12; and FIG. 14 illustrates a perspective view of the assembled kit components of the strap tie down system having an embodiment of a strap tie down apparatus.

DETAILED DESCRIPTION

Figure 1:
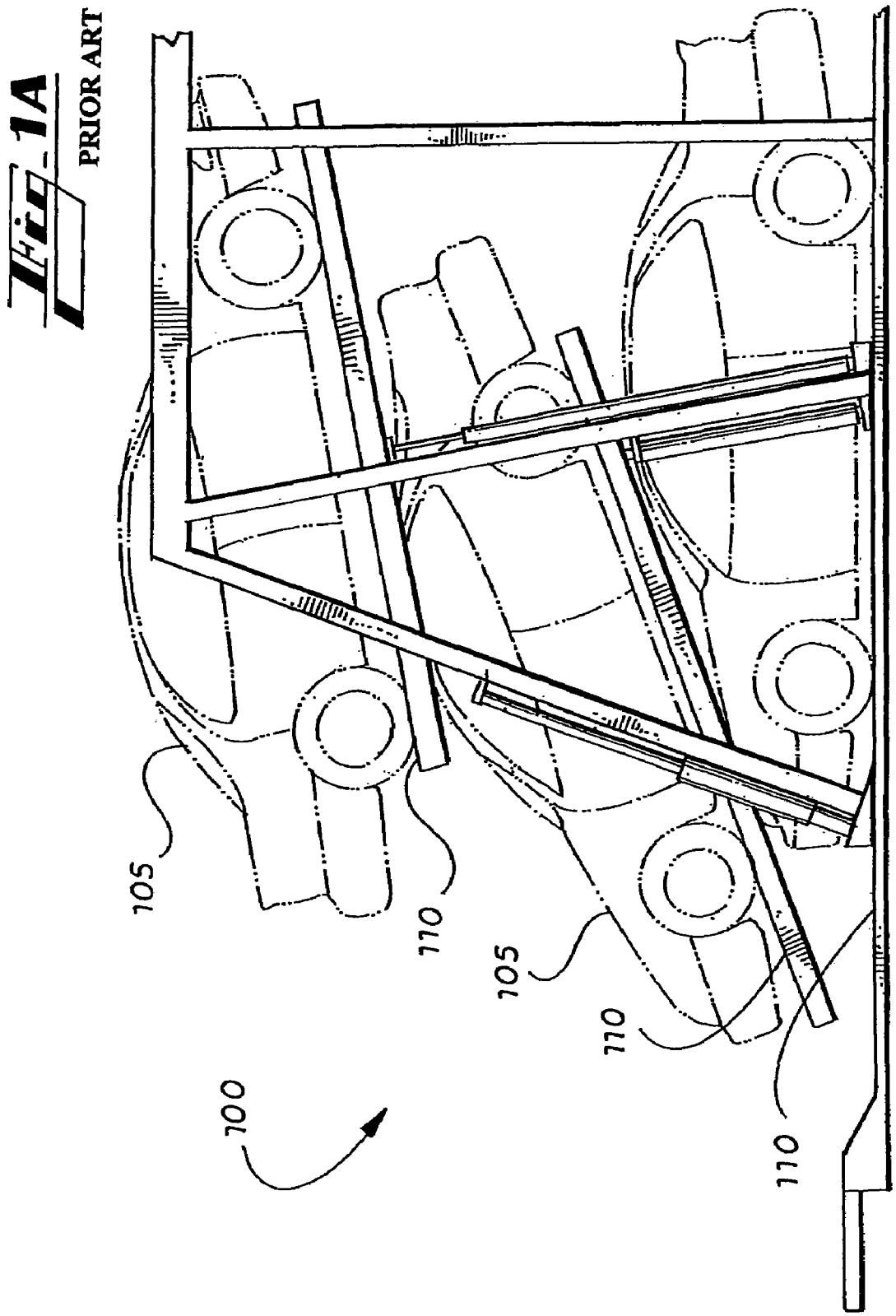
FIG. 1A illustrates a prior art vehicle transport trailer.
FIG. 1B illustrates a side view of a prior art vehicle trailer tie down system.
Figure 2:
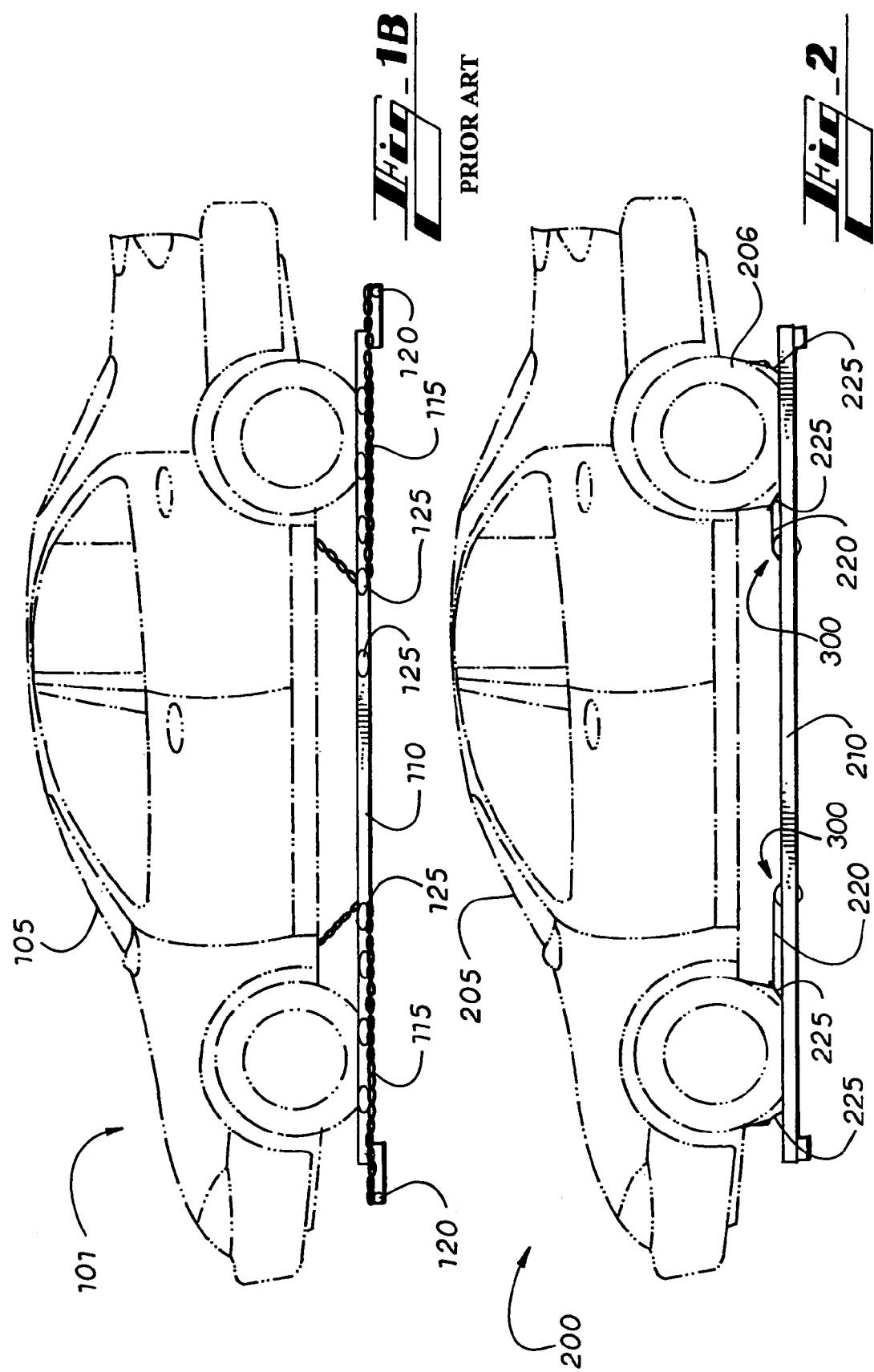
FIG. 2 illustrates a side view of an embodiment of a strap tie down system.

Referring to the drawings wherein like reference numerals designate corresponding parts throughout the several figures, reference is made first to FIG. 2 that illustrates a side view of an embodiment of a strap tie down system 200. The system 200 generally includes a platform 210 similar to prior art systems onto which a vehicle 205 can be loaded. The vehicle 205 is secured to the platform 210 with straps 220. The straps 220 are made from conventionally available materials used in conventional straps such as but not limited to nylon. The straps 220 connect around the wheels 206 of the vehicle 205 and are secured to the platform 210. FIG. 2 illustrates two straps 220. As is described further below, four straps 220 are typically used to secure the vehicle to the platform 210. The system 200 further contains a number of strap tie down apparatuses 300 that are discussed in further detail in the description below. The system 200 further includes multiple removable hooks 225 through which the straps 220 are routed. The hooks 225 are used in conjunction with the strap tie down apparatuses 300. The hooks 225 are adapted to be affixed and removed as needed on desired locations along the platform 210 as is described in further detail below.

As mentioned above, the straps 220 are typically routed around the wheels 206 of the vehicle 205. The straps 220 originate as connected to one of the hooks 225, are routed around the wheels 206, routed through another set of hooks 225 and terminate by being connected to one of the apparatuses 300. If the hooks 225 need to be relocated, for example due to a mis-positioned vehicle 205 or wider/narrower wheel base, the hooks 225 can be removed from the platform 210 as needed and moved to the necessary position along the platform 210. Typically, the hooks 225 are removed and repositioned when the straps 220 are loosened from the apparatuses 300. The ability of the hooks 225 to be removed used in conjunction with an adjustability features of the apparatuses 300 accommodate varying wheel base sizes, vehicle lengths and variations of vehicle position as the vehicles 205 are loaded onto the platform 210.

Figure 3:
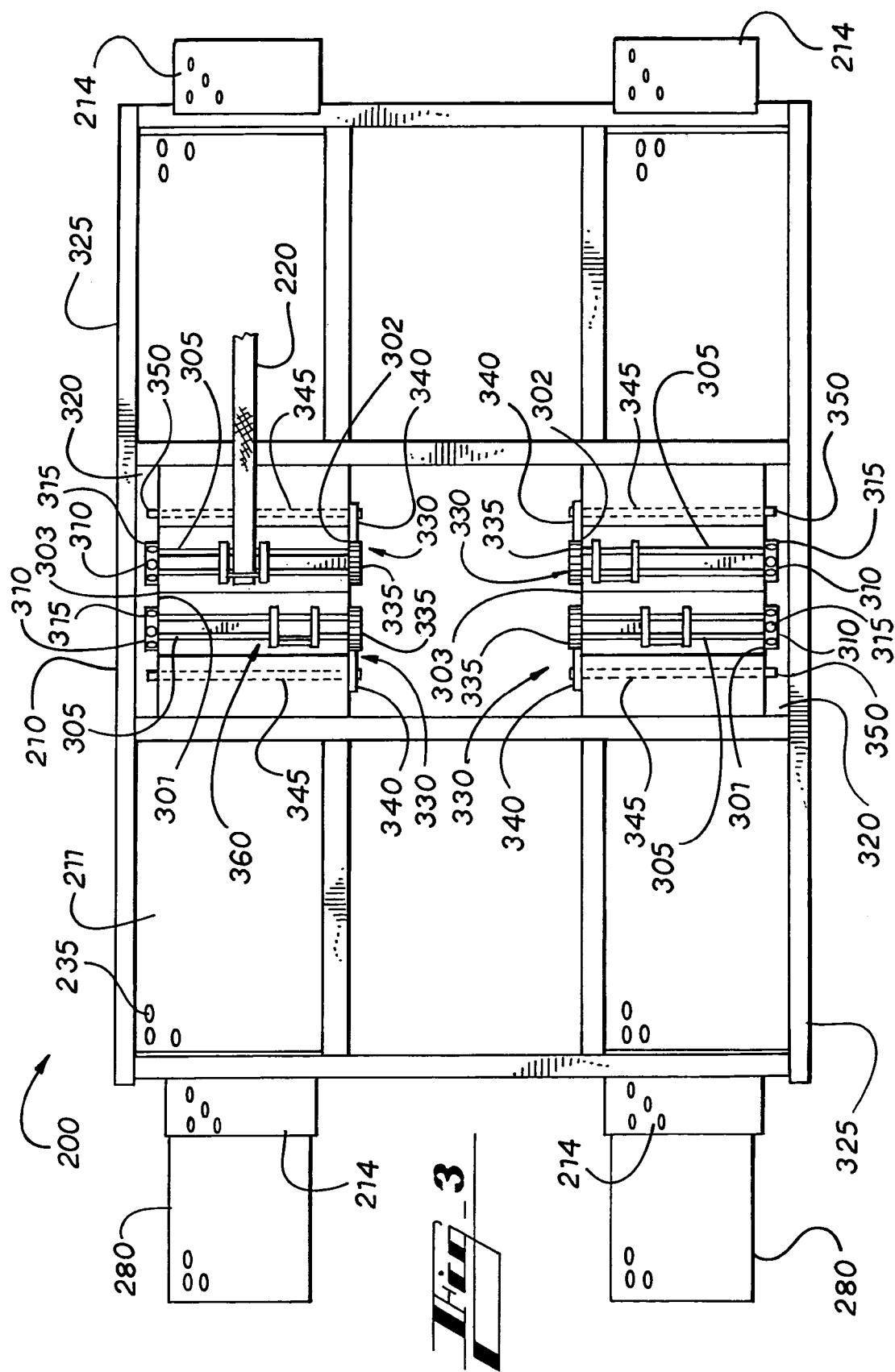
FIG. 3 illustrates a top view of an embodiment of a strap tie down system having multiple tie down apparatuses.
Figure 4:
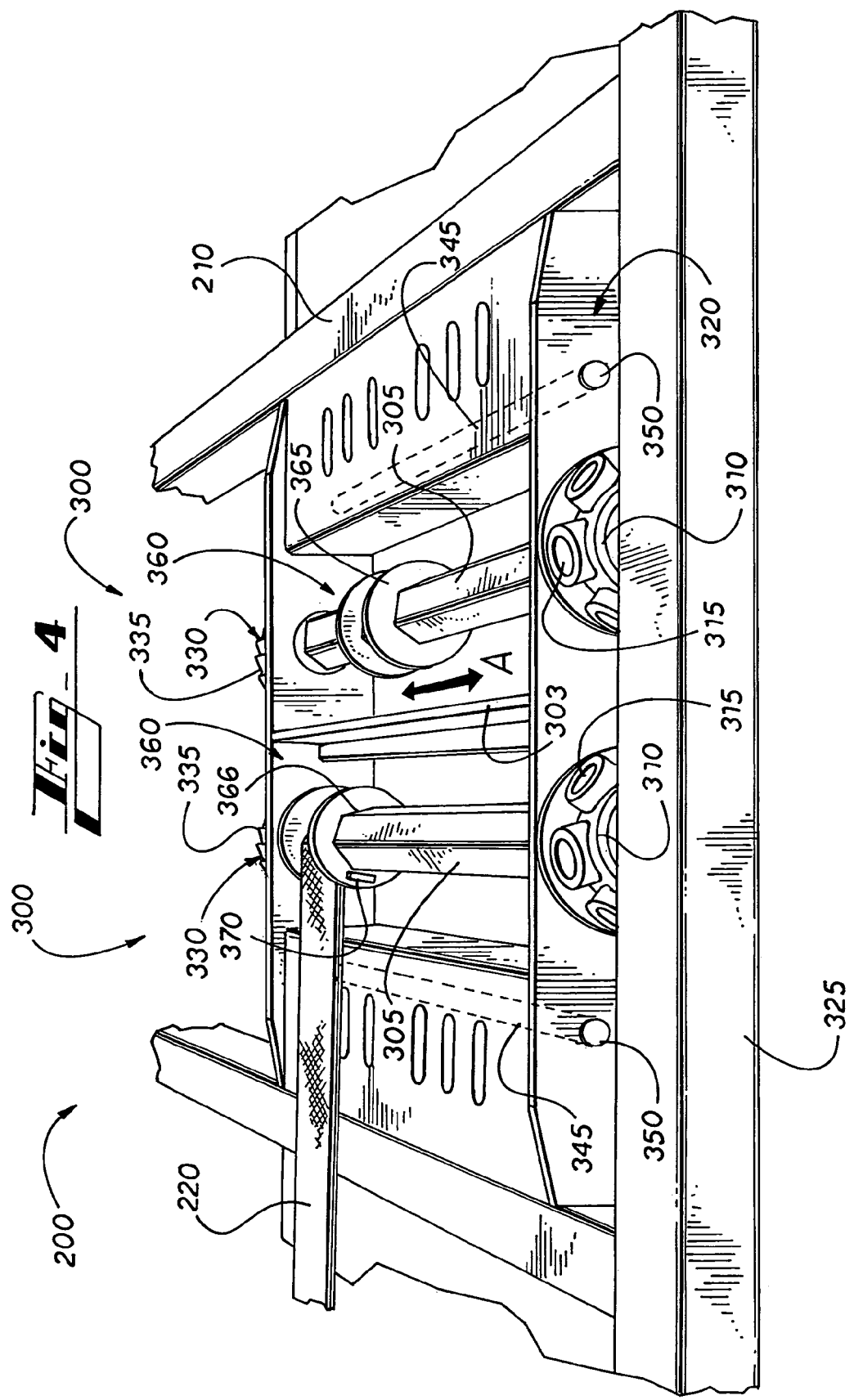
FIG. 4 illustrates a outboard partial perspective side view of an embodiment of a strap tie down system.

Reference is now made to FIGS. 3-5. FIG. 3 illustrates a top view of an embodiment of a strap tie down system 200 having multiple tie down apparatuses 300. FIG. 4 illustrates a outboard partial perspective side view of an embodiment of a strap tie down system 200. FIG. 5 illustrates a inboard partial perspective side view of an embodiment of a strap tie down system 200.

FIG. 3 illustrates a top view of an embodiment of a strap tie down system 200. The system 200 is shown with only one strap 220 connected to one tie down apparatus 300 for illustrative purposes. The remaining tie down apparatuses 300 are without straps for illustrative purposes. The platform 210 includes planar surfaces 211 onto which vehicles 205 can be loaded. The platform 210 is shown with multiple slots 235 into which the removable idlers 225 can be placed and removed as needed as discussed further in the description below. The platform 210 can further include flippers 280 that can be used to load and off load vehicles. It is understood that in other embodiments, the platform 210 may have any other number of form factors depending on the needs of vehicle transport.

In a typical embodiment, multiple apparatuses 300 contribute to make up the system 200. In general, four separate apparatuses 300 are shown in FIG. 3. The apparatuses 300 are shown generally adjacent one another. However, in other embodiments, several apparatuses 300 can be located along the platform 210 at varying locations to advantageously be adjacent at various potential vehicle wheel locations. In a typical embodiment, each apparatus 300 includes an elongated shaft 305 generally rotatably attached to the transport platform 210, generally between two support plates 301, 302. In general, as further discussed in the description below, the elongated shaft 305 is non-circular and allows torque to be transferred between the elongated shaft 305 and a slidable strap spool 360 connected to the elongated shaft 305. The platform 210 can further include a separation plate 303 in between adjacent apparatuses 300 so that when a vehicle wheel 206 drives over the apparatuses 300, the separation plate 303 bears a large portion of the weight of the vehicle 205. A ratchet wrench socket wheel 310 having a plurality of wrench apertures 315 is connected to one side of the shaft 305 and to the support plate 301. In a typical implementation, the ratchet wrench socket wheel 310 is located within a channel 320 formed within the platform 210 between the outer frame 325 and the support plate 301, and therefore partially covered by the outer frame 325 of the platform 210. The ratchet wrench socket wheels 310 are therefore offset inbound from the outer frame 325 of the platform 210. This partial coverage is advantageous for reasons discussed further in the description below. However, it is understood that in other implementations, the ratchet wrench socket wheel 310 can be positioned in other non-covered locations in the platform 210.

The apparatuses 300 further includes a ratchet gear wheel 330 having engagement teeth 335 located on one end of the shaft 305 opposite the end having the ratchet wrench socket wheel 310 and connected to the support plate 302. A quick release pawl 340 is connected to the platform 210 on the support plate 302 adjacent the ratchet gear wheel 330 for engagement with the engagement teeth 335. The pawl 340 is connected to the platform 210 via an elongated rod 345 (shown mostly in phantom) that is connected to the platform 210 between the support plates 301, 302 and generally parallel with the shaft 305. The rod 345 partially protrudes from a surface of the support plates 301 as a button 350 adjacent the ratchet wrench socket wheel 310. A spring 355 is connected to the rod 345 adjacent the pawl 340 and in between the pawl 340 and the support plate 302. As discussed further in the description below, the pawl 340 is typically engaged with the teeth 335 of the ratchet gear wheel 330 so that the straps 220 can be tightened as needed. When the straps 220 are to be loosened, the button 350 can be depressed, which pushes the pawl 340 inboard thereby disengaging with the teeth 335. In this way, the shaft 305 is free to rotate, which allows the strap 220 to be relieved of tension. Therefore, the button 350 provides a quick release mechanism for the system 200. When it is desired to release the tension in the strap 220, a conventional wrench rod can be used to press the button 350 that protrudes adjacent the ratchet wrench socket wheel 310. This action compresses the spring 355 at the other end of the rod 345 that allows the pawl 340 to disengage from the ratchet gear teeth 335. It is further appreciated that the button 350 as well as the ratchet wrench socket wheel 310 are located on an inner semi concealed portion of the platform 210 behind the frame 325. In this way the entire ratchet mechanism is not protruding from the platform 210. In addition, this positioning allows the user to use the outer frame portion 325 as a fulcrum for the wrench rod to apply a force on the button 350. If the system is in a location not partially covered by the outer frame, then a separate piece can be used as the fulcrum.

The apparatus 300 further includes a strap spool 360 slidably connected to the shaft 305. The strap spool 360 generally includes two side plates 365 connected to one another in a generally parallel position by a strap attachment bracket 370, which is generally connected perpendicular to the side plates 365. The side plates 365 each include a central hole that is typically non-circular to allow the shaft 305 to fit through the center of the side plates 365. The strap attachment bracket 370 is typically non-circular and can be a rectangular bar, although it is understood that in other embodiments the strap attachment bracket 370 can have other form factors. In general, the strap attachment bracket 370 is connected between the side plates at a fixed radius from the shaft 305.

In a typical embodiment, the shaft 305 typically has a non-circular cross section, the general advantages of which are now discussed and further discussed in the description below. A hexagonal cross section is illustrated although it is understood that other non-circular cross sections are contemplated in other embodiments. It is appreciated that the non-circular cross section of the shaft allows the strap spool 360 not only to slidably connect to the shaft 305 via the central holes 366 of the side plates 365 but also prevents the strap spool from free rotating about the shaft 305. Therefore, the strap spool 360 can slide along the shaft 305 as indicated by arrow A in FIG. 4. However, when the shaft 305 is rotated, the strap spool 360 rotates with the shaft 305.

Referring more specifically to FIG. 5, when the quick release mechanism button 350 is pressed as mentioned above, the respective pawl 340 is released from the teeth 335 of the ratchet gear wheel 330 so that the shaft 305 can be rotated, typically to loosen the strap 220. One pawl 340 as indicated by I, is dis-engaged from the respective teeth 334 and one pawl 349 as indicated by II is engaged with the respective teeth 335. Furthermore, FIG. 5 illustrates the two different strap spools 260 at two different locations about their respective shafts 305.

Since the spring 355 provides a rotating tension on the rod 345, the pawl 340 attempts to rotate generally in the direction as indicated by arrow B. Therefore, when the button 350 is depressed, the pawl 340 disengages from the teeth 335 and rotates. To prevent over-rotation, the system 200 further includes a stop rod 375 that typically allows the pawl 340 to rest on it. In this way, the pawl 340 remains adjacent the teeth 335. As discussed further in the description below, the pawl 340 is easily re-engaged with the teeth 335 by manually rotating the shaft 305 in a direction opposite the direction as indicated by arrow B. In general, the spring 355 is biased so that it attempts to restore toward a direction that allows the pawl 340 to engage with the teeth 335. In a typical embodiment, the spring 355 is a combination compression and torsion spring. In this way, the compression feature allows the pawl to move in a direction along the shaft to allow disengagement as described above. The torsion feature allows the pawl 340 to rotate about the rod and in a direction away from the teeth and toward the stop rod 375 located adjacent and below the pawl 340. In this way, when the pawl 340 disengages, the restorative force of the compression portion forces the pawl to rest against the face of the ratchet gear wheel 330 that creates frictional forces between the pawl 340 and the face. As mentioned above, when disengaged, the pawl 340 rests on the stop rod. To re-engage the pawl 340 to the teeth 335, the shaft 305 can be manually rotated, which allows the pawl to ride along the face of the ratchet gear wheel 330 back toward the teeth 335 against, but overcoming, the torsion force of the spring 355. When the pawl 340 has reached a point adjacent the teeth 335, the restorative compression force allows the pawl 340 to re-engage the teeth 335.

FIG. 6 illustrates another embodiment of a strap tie down system 300. In the embodiment illustrated in FIG. 6, a ratchet wrench socket wheel 310 having a plurality of wrench apertures 315 is connected to one side of the shaft and a ratchet gear wheel 330 having engagement teeth 335 is located on the same end of the shaft 305 abutted against, flush with or as an integral part of the ratchet wrench socket wheel 310. A quick release pawl 340 is connected to the platform 210 on the support plate 301 adjacent the ratchet wrench socket wheel 310 and the ratchet gear wheel 330 for engagement with the engagement teeth 335. The pawl 340 is connected to the platform 210 via a short rod 346 (shown partly in phantom) that is connected to the platform 210 via the support plate 301 and generally parallel with the shaft 305. A spring 355 is connected to the rod 345 adjacent the pawl 340 and in between the pawl 340 and the support plate 301. As discussed above, the pawl 340 is typically engaged with the teeth 335 of the ratchet gear wheel 330 so that the straps 220 can be tightened as needed. When the straps 220 are to be loosened, a conventional wrench rod can be inserted into an opening 347 on a small platform 348, which is used as a fulcrum to push against the pawl 340 inboard thereby disengaging with the teeth 335. In this way, the shaft 305 is free to rotate, which allows the strap 220 to be relieved of tension. This action compresses the spring 355 at the other end of the rod 346, which allows the pawl 340 to disengage from the ratchet gear teeth 335. Since the spring 355 provides a rotating tension on the rod 346, the pawl 340 attempts to rotate similarly as described above. Therefore, when the pawl 340 disengages from the teeth 335 and rotates, a stop rod 375 that typically allows the pawl 340 to rest on it, prevents over-rotation of the rod 346. In this way, the pawl 340 remains adjacent the teeth 335. In general, the spring 355 is biased so that it attempts to restore toward a direction, which allows the pawl 340 to engage with the teeth 335. In a typical embodiment, the spring 355 is a combination compression and torsion spring. In this way, the compression feature allows the pawl to move in a direction along the shaft to allow disengagement as described above. The torsion feature allows the pawl 340 to rotate about the rod 346 and in a direction away from the teeth and toward the stop rod 375 located adjacent and below the pawl 340. In another embodiment, a flange bushing is positioned between the ratchet gear wheel 330 and the support plate 301. When the pawl 340 is disengaged, the pawl 340 rests against the stationary flange. Typically, rotation of the shaft does not reengage the pawl 340. As mentioned above, when disengaged, the pawl 340 rests on the stop rod. Reengaging the pawl 340 typically requires using the tie down bar to pop the pawl 340 up and back over the gear teeth 335. In general, this type of quick release mechanism is described in U.S. Pat. No. 5,314,275, which is herein incorporated by reference in pertinent part.

FIG. 7A illustrates a outboard partial perspective side view of an embodiment of a strap tie down system 200 connected to a vehicle wheel 206. Typically, the removable hooks 225 are placed into any variety of oval traction holes 235 typically located on the surface 211 transport platforms 210. The hooks 225 are placed to the front and rear of the wheel and strap 220 is wrapped around the wheel as shown. In a typical embodiment, one hook 225a is an originating hook in which the strap 220 is hard-connected. The other hook 225b is one in which the strap can be threaded and removed. Therefore, the hook 225a is typically placed first. The hook 225b is typically placed second and the strap 220 is then threaded through the hook 225b. The end of the strap 220 is shown unattached until placement of the hooks 225a, 225b and the strap 220 confirmed, but it can also be attached. The end of the strap 220 is now shown adjacent the strap spool 260 of one of the apparatuses 300.

FIG. 7B illustrates an outboard partial perspective side view of an embodiment of a strap tie down system 200 connected to a vehicle wheel 206. FIG. 7 illustrates a close up view of a strap 220 rolled onto an embodiment of a strap tie down apparatus 300. The end of the strap is threaded in between the two side plates 365 and through a space that is defined between the portion of the shaft 305 located between the side plates 365 and the strap attachment bracket 370, which is further illustrated in FIGS. 8A-8D below. At this point of the connection of the strap 220 with the apparatus 300, the strap 220 is simply left hanging within the defined space. It is further appreciated that one of the advantages of the slidable strap spool 360 is that it can be adjusted depending on the wheel track of the vehicle 205 or the location on the platform 210 onto which the vehicle 205 was driven. In this way, fine adjustments are possible by sliding the strap spool 360 along the shaft 305 where needed. Once the desired position of the strap spool 360 is attained, the strap 220 can then be tensioned on the shaft 305 and on the strap spool 360, which is now described.

FIGS. 8A-8E illustrate several positions of an embodiment of a strap spool apparatus 360 during a tensioning process. By inserting a conventional ratchet wrench, which is typically an elongated rod, into one of the wrench apertures 315 of the ratchet wrench socket wheel 310, the ratchet wrench socket wheel 310 can be engaged to roll the strap 220 onto the strap spool 360. As the slack of the strap 220 is rolled upon the spool 360, the strap attachment bracket 370 rotates and begins to roll the strap 220 onto itself, thereby creating increasing friction between the different portions of the strap 220 now wrapped upon itself. As the shaft 305 is further rotated, the tension in the strap 220 is increased. It is appreciated that a circular shaft would allow the strap spool 360 to freely rotate about the shaft and thereby apply no usable tension in the strap. The non-circular cross sectional design prevents the strap spool 360 from rotating freely about the shaft 305. Therefore it is appreciated that the connection between the strap spool 360 and the shaft 305 is a torque transferring connection, regardless of the type of non-circular cross section provided on the shaft 305. Therefore, the strap attachment bracket 370 works in conjunction with the cross section of the shaft 305 to create a strong torque and apply a strong tension in the strap 220.

FIG. 8A illustrates the strap spool 360 in a first position. As described above, the strap is simply threaded through the space 371 defined generally between the plates 365, and between the strap attachment bracket 370 and the portion of the shaft 305 opposite the strap attachment bracket 370. The other end of the strap is wrapped around the tire and hooked into the deck as described previously.

FIG. 8B illustrates the strap spool 360 in a second position, a quarter turn from the first position for illustrative purposes. In this second position, the strap attachment bracket 370 has rotated and begins to engage the loose end of the strap 220 and begins the process of rolling the strap back onto itself.

FIG. 8C illustrates the strap spool 360 in a third position, a quarter turn from the second position for illustrative purposes. In this third position, the strap attachment bracket 370 has further rotated and continues to engage the loose end of the strap 220 and places the loose end of the strap 220 into contact with itself.

FIG. 8D illustrates the strap spool 360 in a fourth position, a quarter turn from the third position for illustrative purposes. In this fourth position, the strap attachment bracket 370 has further rotated and has put the loose end of the strap 220 into full contact with itself, thereby providing tension in the strap 220. In this position, a portion of the strap 220 is wrapped around a portion of the shaft 305. The strap 220 is now located on an outer location of the strap attachment bracket 370. The loose end of the strap 220 is therefore pressed in between the strap 220 and the strap attachment bracket 370 and further rotation of the shaft 305 results in greater tension on all portions of the strap 220. Furthermore, continued rotation of the shaft 305 results in further wrapping of the strap 220 around the outer portion of the strap attachment bracket 370 in addition to the shaft 305.

FIG. 8E illustrates the strap spool 360 in a fifth position, a quarter turn from the fourth position for illustrative purposes. In this fifth position, the strap 220 has a tension on it in the direction T which helps provide the maximum tension and friction on the strap 220 wrapped around itself and around the strap attachment bracket 370 and partially around the shaft 305.

FIG. 9A illustrates an alternate embodiment of a strap spool 360. Similar to the embodiments described above, the strap spool 360 generally includes two side plates 365 connected to one another in a generally parallel position by a strap attachment bracket 370, which is generally connected perpendicular to the side plates 365. The side plates 365 each include a central hole that is typically non-circular to allow the shaft 305 to fit through the center of the side plates 365. The strap attachment bracket 370 is typically non-circular and it is understood that in other embodiments the strap attachment bracket 370 can have other form factors. In the embodiment illustrated in FIG. 9A, the strap attachment bracket can be located close to the shaft 305, with a short fixed radius from the shaft 305, and function as a rigid connection between the side plates 365. The strap spool 360 can further include a moveable strap attachment bracket 380 that has a variable radius, r, from the shaft 305. Therefore, the space 371 also is variable.

FIG. 9B illustrates another alternate embodiment of a strap spool 360. Similar to the embodiments described above, the strap spool 360 generally includes two side plates 365 connected to one another in a generally parallel position by an inner strap sleeve 372, which is generally connected perpendicular to the side plates 365. The side plates 365 each include a central hole that is typically non-circular to allow the shaft 305 to fit through the center of the side plates 365. The strap attachment bracket 370 is typically non-circular and it is understood that in other embodiments the strap attachment bracket 370 can have other form factors. The inner strap sleeve 372 fits directly over the shaft 305 and therefore shares the same shape as the shaft 305, in this case a hexagon. In other embodiments, the inner strap sleeve 372 matches the shape of whatever the non-circular shape the shaft 305 may have. The strap spool 360 can further include a moveable strap attachment bracket 380 that has a variable radius, r, from the shaft 305. Therefore, the space 371 also is variable as described above and further below. The embodiment described has additional advantages including the feature that the strap does not come in contact with the shaft 305, but only with the inner strap sleeve 372. Therefore, the strap spool 360 can glide along the shaft without applying unnecessary frictional forces to the strap.

FIGS. 10A-10E illustrate several positions of an embodiment of a strap spool apparatus 360 during a tensioning process. Similarly as described above, as the slack of the strap 220 is rolled upon the spool 360, the strap wraps onto the strap attachment bracket 370 and the moveable strap attachment bracket 380 rotates and begins to roll the strap 220 onto itself, thereby creating increasing friction between the different portions of the strap 220 now wrapped upon itself. It is appreciated that as the strap spool 360 begins to rotate, the moveable strap attachment bracket 380 varies its radius, initially by gravity, and then by increased strap tension. As the shaft 305 is further rotated, the tension in the strap 220 is increased. It is appreciated that a circular shaft would allow the strap spool 360 to freely rotate about the shaft and thereby apply no usable tension in the strap. The non-circular cross sectional design prevents the strap spool 360 from rotating freely about the shaft 305. Therefore it is appreciated that the connection between the strap spool 360 and the shaft 305 is a torque transferring connection, regardless of the type of non-circular cross section provided on the shaft 305. Therefore, the moveable strap attachment bracket 380 works in conjunction with the cross section of the shaft 305 to create a strong torque and apply a strong tension in the strap 220.

FIG. 10A illustrates the strap spool 360 in a first position. As described above, the strap is simply threaded through the space 371 defined generally between the plates 365, and between the moveable strap attachment bracket 380 and the portion of the shaft 305 opposite the moveable strap attachment bracket 380.

FIG. 10B illustrates the strap spool 360 in a second position, a quarter turn from the first position for illustrative purposes. In this second position, the strap 220 still generally hangs in a disengaged position.

FIG. 10C illustrates the strap spool 360 in a third position, a quarter turn from the second position for illustrative purposes. In this third position, the moveable strap attachment bracket 380 has rotated and begins to engage the loose end of the strap 220 and begins the process of rolling the strap back onto itself. During the process the radius, r, may continue to vary during rotation.

FIG. 10D illustrates the strap spool 360 in a fourth position, a quarter turn from the third position for illustrative purposes. In this fourth position, the moveable strap attachment bracket 370 has further rotated and continues to engage the loose end of the strap 220 and positions the loose end of the strap 220 to be into contact with itself. During the process the radius, r, may continue to vary during rotation.

FIG. 10E illustrates the strap spool 360 in a fifth position, approximately a quarter turn from the fourth position for illustrative purposes. In this fifth position, the strap attachment bracket 370 has further rotated and has put the loose end of the strap 220 into full contact with itself, thereby providing tension in the strap 220. In this position, a portion of the strap 220 is wrapped around a portion of the shaft 305 and the strap attachment bracket 370, or alternatively the sleeve 372. The strap 220 is now located on an outer location of the moveable strap attachment bracket 380, which currently has a minimized radius r due to gravity pulling it down toward the shaft 305 or sleeve 372. The loose end of the strap 220 is therefore pressed in between the strap 220 and the moveable strap attachment bracket 380 and further rotation of the shaft 305 results in greater tension on all portions of the strap 220. Furthermore, continued rotation of the shaft 305 results in further wrapping of the strap 220 around the outer portion of the moveable strap attachment bracket 380 in addition to the shaft 305 and, alternatively strap attachment bracket 370.

FIG. 10F illustrates the strap spool 360 in a sixth position, a quarter turn from the fifth position for illustrative purposes. In this sixth position, the strap 220 has a tension on it in the direction T which helps provide the maximum tension and friction on the strap 220 wrapped around itself and around the moveable strap attachment bracket 380 that is also being pulled to a minimized radius r, and partially around the shaft 305 and, alternatively, the strap attachment bracket 370, or sleeve 372.

FIGS. 11A-11H illustrate multiple alternate embodiments for cross sections of non-circular torque transferring shafts and respective strap spools. It is appreciated that a hexagonal cross section has been illustrated as an embodiment of the non-circular cross section of the elongated shaft embodiments. It is appreciated that in general, the non-circular cross section has been described as a cross section that allows the embodiments of strap spool to slide along the shaft, while not allowing the spool to rotate with respect to the shaft, thereby allowing torque to be transferred between the shaft and the strap spool thereby applying tension to the strap. It is appreciated that several other cross sections can be implemented to achieve the desired qualities. As such, any polygonal cross section such as triangular, square, rectangular, pentagonal, octagonal, and the like can be implemented. An oval, elliptical and the like cross sections can also be implemented. In still other embodiments circular shafts containing notches or multiple splines can also be implemented. It is appreciated that the corresponding openings on the side plates of the strap spools have a matching cross section.

Figure 12:
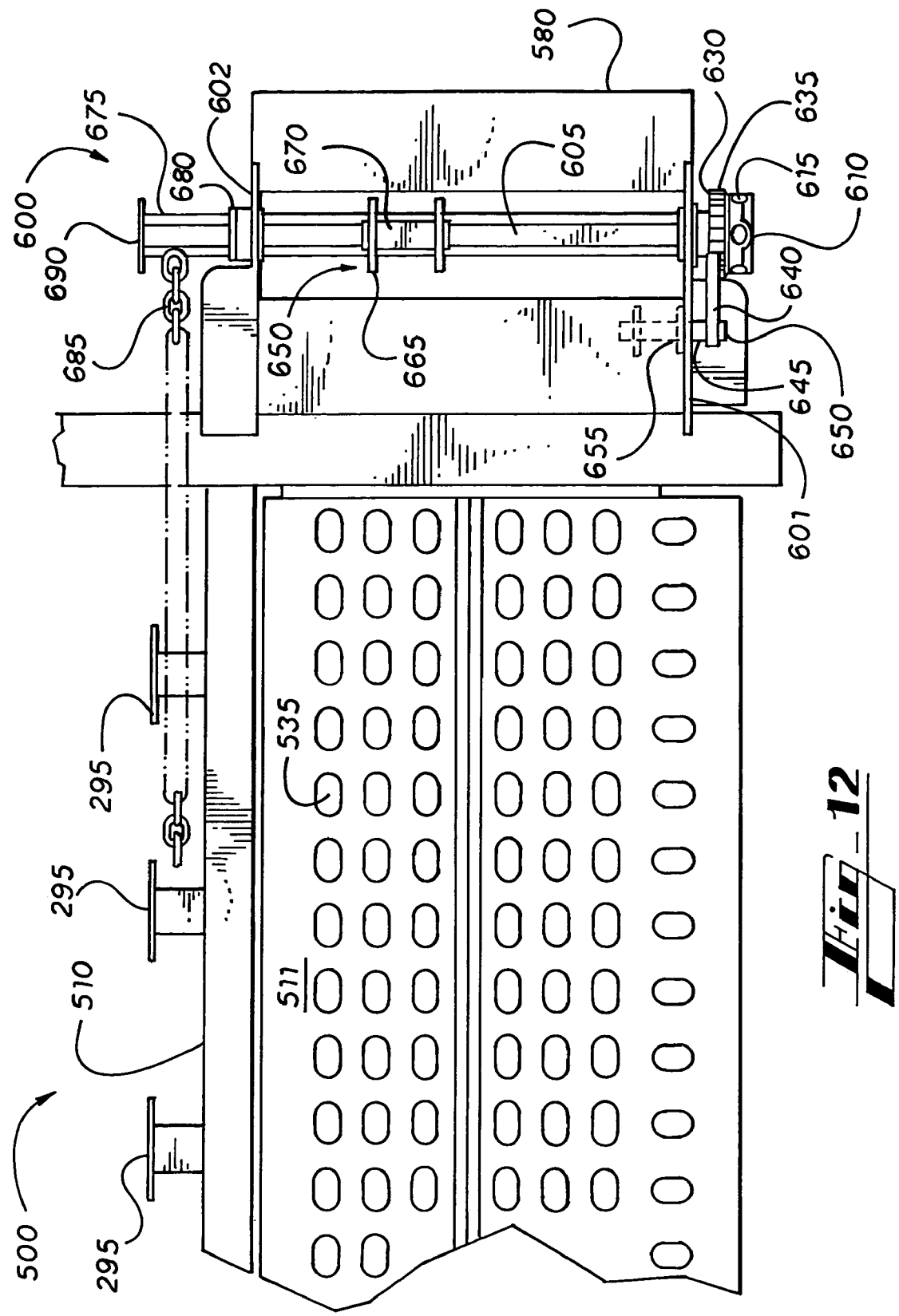
FIG. 12 illustrates a top view of another embodiment of a strap tie down system having an embodiment of a strap tie down apparatus.

FIG. 12 illustrates a top view of another embodiment of a strap tie down system 500 having an embodiment of a strap tie down apparatus 600. The apparatus 600 is illustrated without a strap for illustrative purposes. The platform 510 includes planar surfaces 511 onto which vehicles can be loaded. The platform 510 is shown with multiple slots 535 into which the removable idlers can be placed and removed as needed as discussed above. The platform 510 can further include deck extensions 580 that can be used to load and off load vehicles. In the embodiment shown, the apparatus 600 is incorporated into the deck extension 580.

Each apparatus 600 typically includes rotatable elongated shaft 605, generally between two support plates 601, 602. A ratchet wrench socket wheel 610 having a plurality of wrench apertures 615 is connected to one side of the shaft 605 and to the support plate 601.

The apparatus 600 further includes a ratchet gear wheel 630 having engagement teeth 635 located adjacent and on the same side of the shaft 605 as the ratchet wrench socket wheel 610 and also connected to the support plate 601. A quick release pawl 640 is connected to the support plate 601 adjacent the ratchet gear wheel 630 for engagement with the engagement teeth 635. The pawl 640 is connected to a rod 645 that is connected at the support plate 601 and generally parallel with the shaft 605. The rod 645 partially protrudes from a surface of the support plates 601 as a button 650 adjacent the ratchet wrench socket wheel 610. A spring 655 is connected to the rod 645 adjacent the pawl 640. As discussed above, the pawl 640 engages and disengaged with the teeth 635 of the ratchet gear wheel 630 so that the straps can be tightened and correspondingly loosened as needed. In one embodiment, the pawl 640 works with other components in conjunction to form a quick release mechanism, as described above and in U.S. Pat. No. 5,314,275, which is herein incorporated by reference in pertinent part.

The apparatus 600 further includes a strap spool 660 slidably connected to the shaft 605. Similar to as described above, the strap spool 660 generally includes two side plates 665 connected to one another in a generally parallel position by a strap attachment bracket 670, which is generally connected perpendicular to the side plates 665. The side plates 665 each include a central hole that is typically non-circular to allow the shaft 605 to fit through the center of the side plates 665.

In a typical embodiment, the shaft 605 typically has a non-circular cross section as discussed above. A hexagonal cross section is illustrated although it is understood that other non-circular cross sections are contemplated in other embodiments. It is appreciated that the non-circular cross section of the shaft allows the strap spool 660 not only to slidably connect to the shaft 605 via the central holes 666 of the side plates 665 but also prevents the strap spool from free rotating about the shaft 605.

FIG. 12 further illustrates that the apparatus 600, in another embodiment, can further include a shaft extension 675. The shaft extension 675 can be a separate part that is connected to the shaft 605 or it can be an integral part of the shaft 605. The shaft extension 675 can further include a non-circular cross section similar to the shaft 605. In general, the shaft 605 and shaft extension are through-fit the support plate 602 so that the shaft extension 675 protrudes from the support plate 602. The shaft extension 675 can be supported within the support plate 602 with a coupler/bushing 680 that allows the shaft 605 and shaft extension 675 to rotate with respect to the support plate 602. (In general, the coupler/bushing 680 not only supports the rotation but also couples the non-circular shaft 605 and shaft extension 675 circumferences to an outer circular circumference of the coupler/bushing 680 so that rotation is possible). In another embodiment, the extension 675 is an integral piece of the shaft 605 with the extension portion running outside of the side wall supports.

Another tying device 685, typically a chain, is connected to the shaft extension 675. In one implementation, the chain can be bolted, welded or otherwise connected to the shaft extension 675. The shaft extension 675 further includes an outer plate 690. The shaft extension 675 is typically co-aligned with a series of conventional idlers 295 located at various locations along the platform 510. In this way, the tying device 685 can be routed along the idlers 295 as needed. In general, in the embodiment shown, the system 500 can include the shaft extension 675 and other components discussed above in addition to the slidable spool 660 and accompanying components in order to accommodate both straps for tying around wheels as discussed above and other tying devices 685 such as chains if it is determined or desired that a tying device be used to connect to the underbody of the vehicle.

If it is desired to use the tying device 685, it can be connected to the vehicle accordingly and the shaft 605 can be ratcheted and tensioned by rotating the ratchet wrench socket wheel 610. In this way, the spool 660, although rotating with the shaft 605, is not involved. Instead, the tying device 685 now rolls onto the shaft extension 675, thereby increasing the tension in the tying device 675. In another embodiment, the spool 660 can be removed and the system can be utilized as a chain-only system, with easy retrofit to strap usage at a later date.

In general, it is appreciated that the positioning of the ratchet wrench socket wheel 610 and the ratchet gear wheel 630 on the same side of the shaft 605 can be implemented without the shaft extension 675. In another implementation, the shaft extension 675 can be removed when not in use.

There are many other additional features of the apparatuses and systems described above. The winch structure is integrated into deck/platform design. The adjustable location feature to accommodate small/medium and large wheel track vehicles.(Tires set narrower or wider). In general, the embodiments include a non-circular cross section tie down shaft capable of transferring torque to a slidable strap attachment bracket. The strap attachment bracket provides a means of attaching straps or other tension members used in load securement. The strap attachment bracket provides a means for inserting and taking slack out of strap or other tension members. The strap attachment bracket provides a way of attaching straps or other tension device without cutting holes or slots in tie down shaft and possibly weakening tie down shaft. The strap attachment bracket has similar non-circular cross section as shaft to transfer torque from shaft to securement bracket. The system is adaptable to vehicles being loaded off center (vehicle biased to one side of trailer). The system can be moved out of the way while vehicles drive over.

FIG. 13 illustrates an exploded perspective view of the a strap tie down system 500 having an embodiment of a strap tie down apparatus 600 as illustrated in FIG. 12. The exploded view illustrates the constituent components as described above in addition to basic additional connectors, bushings and the like. The exploded view illustrates that the system 500 and apparatus 600 can be used to retrofit existing strap systems advantageously from a kit. FIG. 14 illustrates a perspective view of the assembled kit components of the strap tie down system 500 having an embodiment of a strap tie down apparatus 600.

The foregoing is considered as illustrative only of the principles of the invention. Further, various modifications may be made to the invention without departing from the scope thereof and it is desired, therefore, that only such limitations shall be placed thereon as are imposed by the prior art and which are set forth in the appended claims.

What is claimed is:

1. A strap tie down apparatus, comprising:
   an elongated shaft located between a first support plate and a second support plate;
   a shaft extension connected to the elongated shaft and protruding beyond a surface of one of the first and second support plates;
   a strap spool coupled to the elongated shaft, wherein the strap spool is adjustable along the elongated shaft;
   a vehicle tying device connected to the shaft extension;
   a ratchet gear wheel located on a first end of the elongated shaft; and
   a ratchet wrench socket wheel located on the first end of the elongated shaft.

2. The apparatus as claimed in claim 1 wherein the vehicle tying device is a chain.

3. The apparatus as claimed in claim 2 wherein the chain is bolted to the shaft extension.

4. The apparatus as claimed in claim 1 wherein the strap spool rotates with the shaft.

5. The apparatus as claimed in claim 1 wherein the shaft extension is located on a second end of the shaft.

6. The apparatus as claimed in claim 1 further comprising a coupling located between and rotatably connecting one of the first and second support plates and the shaft.

7. The apparatus as claimed in claim 1 wherein the strap spool comprises a central hole through which the elongated shaft is positioned.

8. The apparatus as claimed in claim 7 wherein the strap spool is adjustable between the first and second support plates.

9. A combination chain and strap tie down system, comprising:
   an elongated shaft located between a first support plate and a second support plate;
   a shaft extension connected to and positioned on a first end of the elongated shaft and protruding beyond a surface of one of the first and second support plates;
   a chain connected to the shaft extension;
   a ratchet gear wheel located on a second end of the shaft;
   a ratchet wrench socket wheel located on the second end of the shaft;
   a strap spool having a central hole through which the elongated shaft is positioned, the strap spool configured to receive a strap located along the elongated shaft, wherein the strap spool is adjustable along the elongated shaft between the first and second support plates; and
   means for transferring torque between the strap spool and the elongated shaft.

* * * * *